June 23, 1959 R. D. FAGGE 2,891,513
ELECTRODE-RECIPROCATING SPOT WELDING GUN
Filed April 19, 1957 2 Sheets-Sheet 2
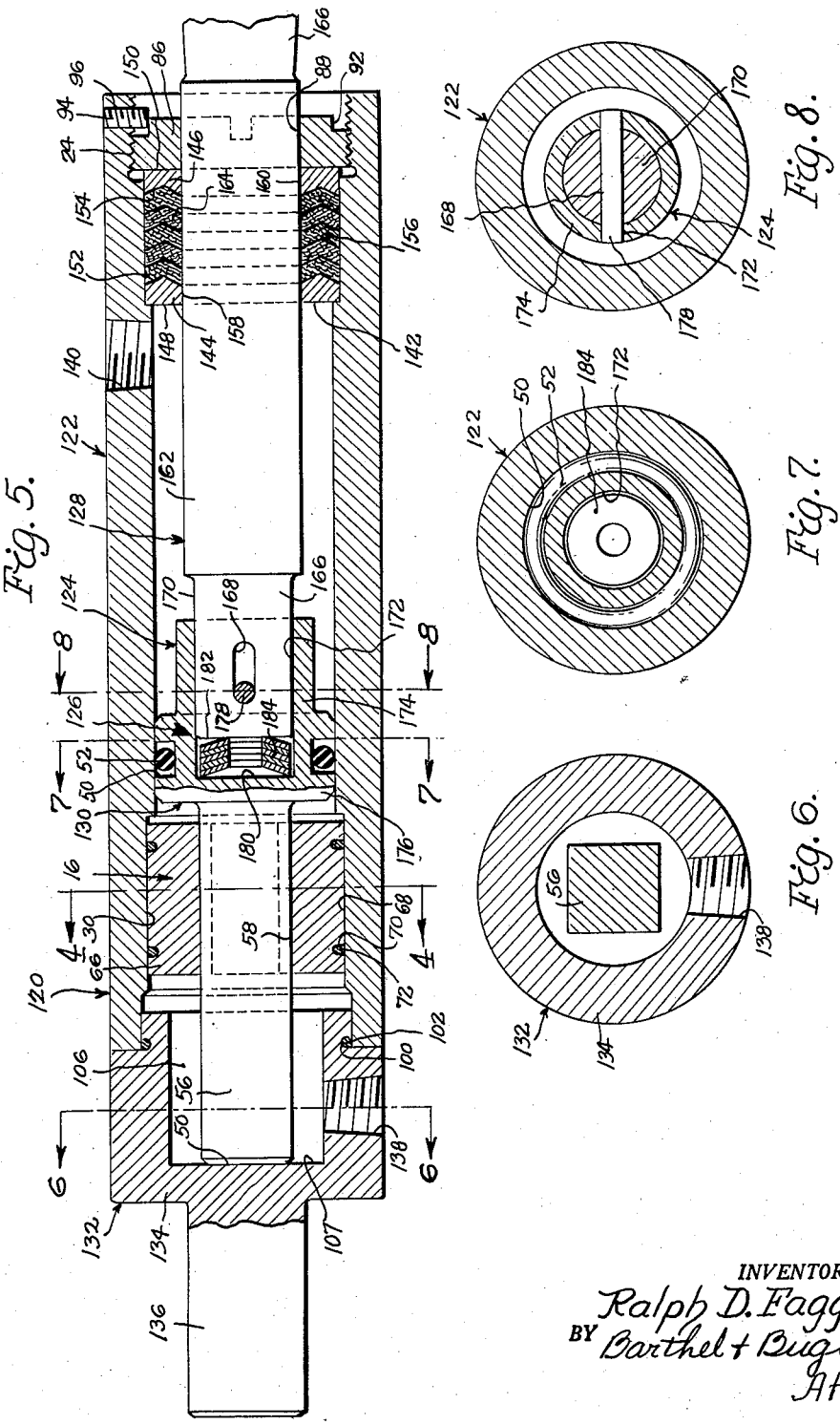
INVENTOR.
Ralph D. Fagge
BY Barthel + Bugbee
Attys

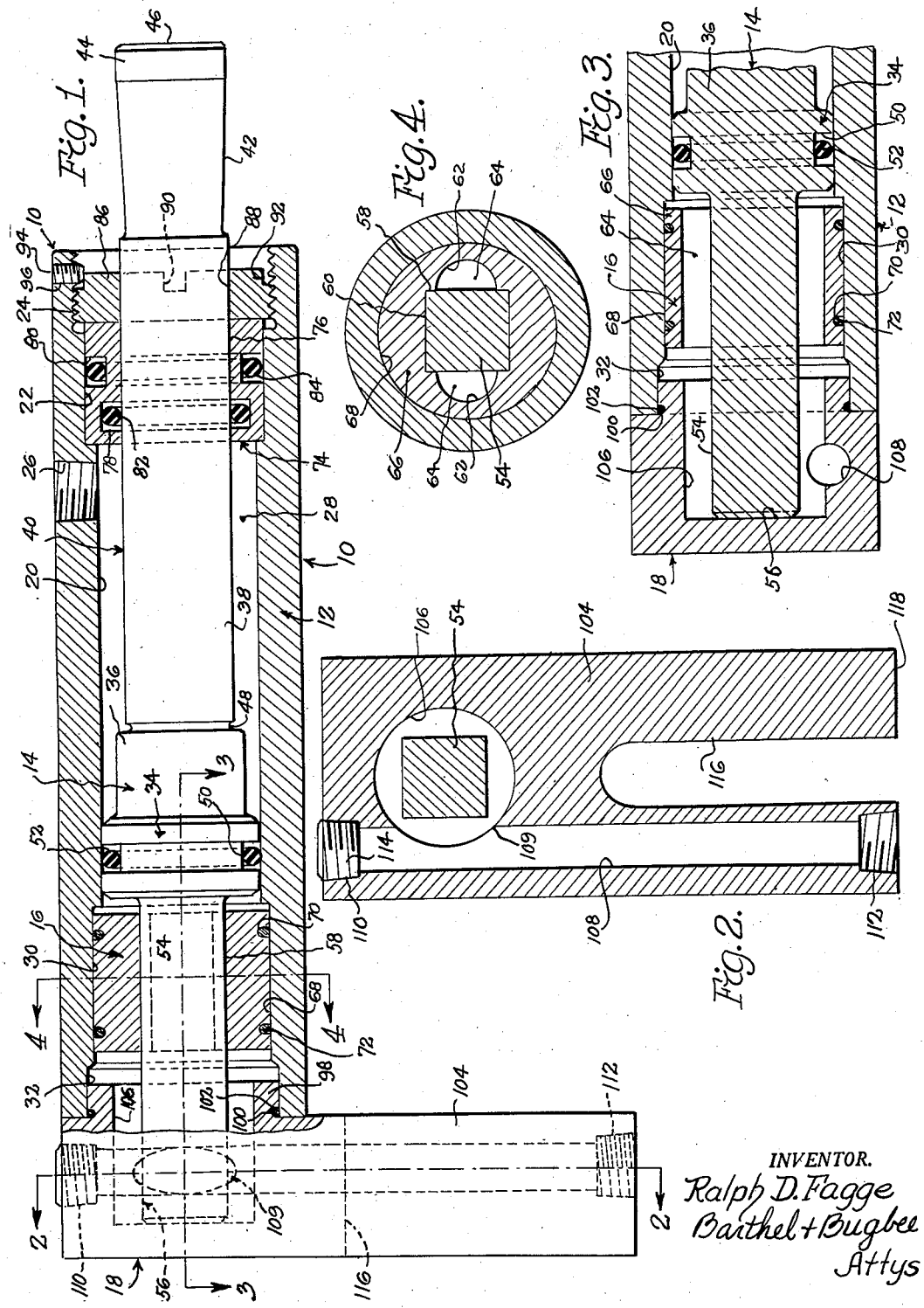

2,891,513
ELECTRODE-RECIPROCATING SPOT WELDING GUN

Ralph D. Fagge, Detroit, Mich.; Sophie A. Fagge administratrix of the estate of said Ralph D. Fagge, Sr., deceased Application April 19, 1957, Serial No. 653,961

5 Claims. (Cl. 121—38)

This invention relates to so-called spot welding guns and, in particular, to so-called fixture-type spot welding guns where the welding gun is mounted on and supported by a fixture or structure which holds it in a definite position in contradistinction to portable spot welding guns which are carried by the operator to the part of the work to be welded.

One object of this invention is to provide a fixture-mounted spot welding gun having a cylinder with a piston reciprocable therein and improved means for preventing rotation of the piston rod in the cylinder, thereby preventing rotation of the welding electrode secured to the outer end of the piston rod.

Another object is to provide a fixture-supported spot welding gun of the foregoing character wherein the rotation-preventing construction of the cylinder and piston rod also provides means for the passage of fluid to and from the piston head for reciprocating and retracting the piston.

Another object is to provide a fixture-supported spot welding gun wherein the piston head and piston have a yieldable connection therebetween with resilient means for quickly moving the piston rod relatively to the piston in a follow-up action responsive to the softening of the metal of the weld under the welding heat, so as to impart a rapid flexibility to a welding gun wherein the piston is actuated by hydraulic pressure fluid.

Another object is to provide a fixture-supported spot welding gun of the foregoing character, the component parts of which are so constructed and arranged as to facilitate mass production at minimum costs and therefore enabling these welding guns to be sold at the minimum price to the user.

Other objects and advantages of the invention will become apparent during the course of the following description of the accompanying drawings, wherein:

Figure 1 is a central vertical longitudinal section, partly in side elevation, of a fixture-supported spot welding gun, according to the invention, with the welding electrode holder and electrode omitted in order to simplify the showing;

Figure 2 is a cross-section taken along the line 2—2 in Figure 1;

Figure 3 is a fragmentary central horizontal longitudinal section taken along the line 3—3 in Figure 1;

Figure 4 is a cross-section taken along the line 4—4 in Figure 1 and also along the line 4—4 in Figure 5, showing details of the rotation-preventing construction between the piston rod and cylinder;

Figure 5 is a central longitudinal vertical section through a modified fixture-supported spot welding gun equipped with a follow-up pressure device to impart added flexibility with hydraulic pressure fluid as the motive fluid.

Figure 6 is a cross-section along the line 6—6 in Figure 5;

Figure 7 is a cross-section along the line 7—7 in Figure 5; and

Figure 8 is a cross-section along the line 8—8 in Figure 5.

Referring to the drawings in detail, Figure 1 shows a fixture-supported spot welding gun, generally designated 10, which is especially well adapted for use with compressed air or other expansible pressure fluid as the motive fluid and consists generally of a cylinder structure 12, a piston structure 14, a rotation-preventing structure 16 and a supporting structure 18, by which the welding gun 10 is mounted upon and supported by a fixture or other arrangement for holding the welding gun or a plurality of welding guns in prearranged positions.

The cylinder structure 12 (Figure 1) is of tubular construction with a main cylinder bore 20 which at its forward end widens into a forward intermediate bore 22 which in turn widens into a forward outer threaded bore 24. A threaded service port 26 leads into the cylinder chamber 28 formed by the main bore 20 immediately inward of the forward intermediate bore 22. At its rearward or opposite end, the main bore 20 widens into a rearward intermediate bore 30 which in turn widens into a rearward outer bore 32. Reciprocably mounted in the main bore 20 is the piston head, generally designated 34, of the piston structure 14, the piston head 34 on its forward side being connected by an enlarged intermediate piston rod portion 36 to a main piston rod portion 38 of the piston rod, generally designated 40. The main piston rod portion 38 terminates at its outer end in a reversely or inwardly-tapered portion 42 and an adjoining cylindrical end portion 44 immediately adjacent the end 46 of the piston rod 40. An annular groove 48 separates the intermediate and main piston rod portions 36 and 38 from one another. The piston rod portions 36, 38, 42 and 44, as well as the piston head 34, are of substantially circular cross-section.

The piston head 34 (Figure 1) is of cylindrical form with an annular groove 50 of rectangular cross-section therein. Mounted in the groove 50, which is of greater width than its depth, is a so-called O-ring or resilient sealing member 52 of toroidal shape and of a diameter slightly greater than the depth of the groove 50 but less than the width thereof. The O-ring 50 is made of resilient material known generically as elastic deformable material or elastomer, by which is meant materials of natural or synthetic rubber-like properties, and including synthetic plastics with rubber-like properties. The nature of the dimensional and material characteristics of the sealing member 52 and its groove 50 are such that during reciprocation of the piston rod structure 14, the sealing member 52, while sealingly engaging the main cylinder bore 20, rolls back and forth in the groove 50 with an inside-out rotation because of its resilient construction and frictional engagement with the bore 20. It will be evident that the annular groove and O-ring sealing arrangement shown at 78, 80, 82, 84 in Figure 1 may be replaced by a different form of sealing and packing construction such as by the so-called chevron packing arrangement shown, for example, in a corresponding location in Figure 5.

Immediately to the left or rearward side of the piston head 34 (Figures 1 and 4), the piston structure 14 narrows into a guide rod portion 54 of substantially rectangular cross-section, which continues to be rectangular cross-section up to the rearward end 56 thereof (Figure 2). Within the rearward intermediate bore 30, the guide portion 54 passes through a central bore 58 (Figure 4) with a central portion 60 of rectangular cross-section and with lateral portions 62 of semi-circular cross-section providing fluid passageways 64 in a guide insert or plug 66 of approximately cylindrical shape and circular cross-section. The guide insert 66 has a cylindrical outer surface 68 snugly fitting the bore 30 and containing annular grooves 70 in which are mounted rings 72 of brazing or welding wire or the like which, when heated, solidly secures the guide insert 60 firmly and fixedly in the rearward intermediate bore 30 without possibility either of leakage or of slippage therein.

Inserted snugly in the forward intermediate bore 22 is a cylindrical sealing plug or insert or closure 74 with a central bore 76 snugly but slidably fitting the main piston rod portion 38 and having internal and external annular grooves 78 and 80 respectively of approximately rectangular cross-section similar to that of the piston head groove 50 and similarly containing O-rings or annular sealing members 82 and 84 of toroidal shape and of elastic deformable or elastomer material. The grooves 78 and 80 are, like the groove 50, wider than their depth, which in turn is less than the minor diameter of the O-ring 82 or 84, so that the latter exerts a sealing effect while rolling inside out back and forth relatively to its respective groove as the piston structure 14 reciprocates. The O-ring 84, of course, being engaged with stationary parts both internally and externally, exerts its sealing effect without rolling. The closure 74 is held in position within the forward intermediate bore 22 by an annular threaded ring or nut 86 having a central bore 88 snugly but slidably engaging the piston rod portion 38. The ring 86 is provided with notches 90 for the engagement of a spanner or other wrench, and is also provided with a smooth reduced diameter portion 92 engaged by a locking set screw 94 threaded into a transverse threaded hole 96 in the cylinder structure 12.

Fitted snugly into the rearward outer bore 32 is the correspondingly shaped hollow cylindrical boss 98 projecting laterally from the supporting structure 18 and permanently secured in position by an annular groove 100 containing a ring 102 of brazing wire or the like heated to effect a permanent junction. The boss 98 and the adjacent body portion 104 (Figures 1, 2 and 3) are provided with a bore or cup-shaped chamber 106 having a rearward end or abutment wall 107 opening at its forward end into the bore 32 and thence into the passageways 64 (Figure 4) and eventually into the main cylinder bore 20 rearwardly of the piston head 34. The body portion 104 is in the form of an elongated rectangular block (Figures 2 and 3) of rectangular cross-section containing an elongated fluid supply passageway 108 intersecting the chamber 106 as at 109 and at its opposite ends provided with threaded service ports 110 and 112 respectively. Only one of these ports is ordinarily used at a given time, depending upon the greater accessibility of one or the other, the unused port being closed by a threaded plug 114 (Figure 2).

The body portion 104 of the supporting structure 18 is provided with a mounting slot 116 (Figure 2) extending inwardly from the free end 118 thereof and of elongated U-shaped cross-section. The mounting slot 116, as its name signifies, is used to receive a bolt or bolts by which the supporting structure 18 of the welding gun 10 is adjustably secured to the frame or fixture (not shown).

In the operation of the spot welding gun 10, let it be assumed that the gun 10 has been mounted, as by bolts, through the mounting slot 116, upon a fixture or framework either by itself or in spaced relationship to a number of similar welding guns. Let it also be assumed that the service ports 26 and 112 have been connected by suitable piping to a source of pneumatic pressure fluid, such as compressed air from an air compressor, by way of a reversing control valve, such as a conventional four-way valve. Let it further be assumed that the control valve is provided with conventional mechanism and equipment (not shown) by which the flow of pressure fluid may be reversed between the ports 112 and 26 in rapid alternation, so that the movable welding electrode mounted in the welding electrode holder (not shown) upon the end portions 42 and 44 of the piston rod structure 40 will be rapidly reciprocated while the welding current is caused to flow between the movable welding electrode and the fixed or stationary welding electrode and the fixed or stationary welding electrode spaced therefrom with the workpieces to be welded positioned therebetween. Let it finally be assumed that the welding electrodes are connected in circuit with a conventional welding transformer, so that welding current of high amperage (of the order of 10,000 to 50,000 amperes) and low voltage (of the order of 3 to 12 volts) passes between the electrodes and the workpieces.

As the welding electrodes make contact with and press together the workpieces, such as sheet metal parts, the subsequent softening of the metal of the parts under the high welding head causes them to become fused to one another. At the same time, the elastic nature of the pneumatic pressure fluid employed as the motive fluid provides a follow-up action which moves the electrodes repeatedly into engagement with the workpieces notwithstanding their softening behavior. The result is that the workpieces are securely spot-welded to one another whereupon welding is terminated, the welded workpieces removed and unwelded parts moved into the space previously occupied by the welded workpieces for further welding operations. Since the rotation-preventing structure 16 consisting of the squared guide rod portion 54 slidably fitting the rectangular central portion 60 of the bore 58 prevents relative rotation between the electrodes during reciprocation of the piston structure 14 while permitting pressure fluid to flow through the side passageways 64 (Figures 3 and 4), the parts to be welded are welded to one another effectively and without relative displacement.

The modified fixture-supported spot welding gun, generally designated 120, shown in Figure 5, is of generally similar construction to the welding gun 10 of Figures 1 to 4 inclusive, similar reference numerals being used where the parts are of essentially the same construction. The welding gun 120 differs principally from the welding gun 10 by being especially adapted for use with hydraulic pressure fluid, for which purpose it is provided with a cylinder structure 122 containing a piston structure 124 having a follow-up device 126 between the piston rod, generally designated 128, and the piston and guide rod assembly, generally designated 130, in order to compensate for the inelasticity of hydraulic pressure. The supporting structure 132 of the modified welding gun 120 is also somewhat modified as regards its body portion 134 in that it has a cylindrical shank 136 projecting axially therefrom for insertion and securing in a corresponding bore in a fixture or frame. The body portion 134 is of cup-shaped form containing a single threaded service port 138 which serves a purpose analogous to that of the service port 112 of the welding gun 10 of Figure 1. The service port 138 thus opens directly into the chamber 106 which, as before, opens into the rearward outer bore 32 adjacent the plug 66 in the rearward intermediate bore 30 of the cylinder structure 122 to support the piston rotation-preventing structure 16 of the same construction as in Figure 1.

The cylinder structure 122 also contains a service port 140 analogous to the service port 26 of Figure 1, but preferably used for hydraulic pressure fluid rather than pneumatic pressure fluid. The forward intermediate bore 22 of Figure 5 and forward threaded outer bore 24 together with the set screw 94 in the threaded transverse bore 96 and the threaded retaining ring or nut 86 are essentially the same in Figure 5 as in Figure 1 but the insert 142 is shown as employing a different sealing arrangement than the insert 74 of Figure 1. It will be understood, however, that the sealing insert 142 may be used, if desired, interchangeably with the sealing insert 74 of Figure 1. The sealing insert 142 of Figure 5 consists of inner and outer washer-shaped or collar-shaped members 144 and 146 of annular form with essentially flat exposed external surfaces 148 and 150 and annular surfaces 152 and 154 of V-shaped section and of respectively convex and concave form. Disposed between the surfaces 152 and 154 in compressed relationship therebetween are multiple sealing gaskets or packing rings 156 of the so-called chevron type. These are compressed by the threaded retaining ring or nut 86 when it is screwed into the threaded forward outer bore 24 and secured by its set screw 94, the members 144 and 146 having central bores 158 and 160 snugly but slidably receiving the main piston rod portion 162 which also passes through similar openings 164 in the packing rings 156.

The main piston rod portion 162 leads into a reversely-tapered portion 166 similar to the portion 42 of Figure 1, for the reception of the movable welding electrode holder, as described above. The opposite or inner end portion 166 is of reduced diameter relatively to the main portion 162 and is provided with an elongated axially-extending slot 168 and a cylindrical outer surface 170. The latter slidably engages a bore 172 in a sleeve 174 integral with and extending axially forward from the piston head 176 which, as before, contains a groove 50 of rectangular cross-section and O-ring 52 as described above. The sleeve portion 174 is drilled transversely to receive the opposite ends of a cross pin 178 (Figure 8) by which a lost motion connection is established with the piston rod 128. The bore 172 is cup-shaped and terminates in an end wall 180 within the piston head 176 spaced away from the inner or rearward end 182 of the piston rod 128. Disposed in the space in the bore 172 between the surfaces 180 and 182 are dished multiple spring washers 184 (Figures 5 and 7) known commercially as Belleville spring washers and adapted to provide a resilient force-transmitting connection between the piston head 130 and the piston rod 128 to provide a follow-up action during welding, as explained below in connection with the operation of the welding gun 120.

As previously stated, the cylinder structure 122 within the rearward intermediate bore 30 contains an insert 66 with a bore 58 of square or rectangular cross-section slidably fitting a guide rod portion 54 of corresponding rectangular cross-section as in Figure 1, the end 56 engaging the end wall 107 of the chamber 106 as an abutment wall at the rearward end of the stroke of the piston structure 124.

In the operation of the fixture-supported spot welding gun 120, let it be assumed that the gun 120 has been mounted upon the fixture or framework (not shown) by inserting the shank 136 of its supporting structure in a corresponding bore and that the service ports 138 and 140 have been connected by suitable piping to a source of hydraulic pressure fluid, such as oil under pressure from a hydraulic pump, by way of a conventional four-way hydraulic control valve (not shown). Let it also be assumed that the control valve is provided with conventional mechanism and equipment (not shown) by which the flow of hydraulic pressure fluid may be reversed between the service ports 138 and 140 in alternation, so that the movable welding electrode mounted upon the end portion 166 (not shown) may be reciprocated relatively to the fixed or stationary electrode (also not shown) mounted in spaced relationship thereto upon the welding fixture while the welding current is caused to flow between the electrodes with the workpieces to be welded positioned therebetween and pressed together by the force applied to the piston structure 124 by the hydraulic pressure fluid acting against the piston head 176.

As the welding heat softens the metal of the sheet metal or other parts being spot-welded, yielding takes place and ordinarily the relatively inelastic hydraulic pressure is incapable of rapidly accommodating itself to such yielding. Under these circumstances, the spring washers 184 come into operation by being compressed or flattened during the initial part of the stroke of the piston structure 124, and resume their dished shapes in exerting a follow-up action upon the end 182 of the piston rod 128 with the slot 168 and cross pin 178 permitting such relative reciprocation therebetween. In this manner, the softening of the metal during welding is automatically followed up by the action of the cupped spring washers 184 in a manner simulating the action of the elastic pneumatic pressure fluid used in the welding gun 10 of Figures 1 to 4 inclusive.

What I claim is:

1. An electrode-reciprocating spot welding gun, comprising a cylinder structure having a cylinder bore therein, a piston structure having a piston head reciprocably engaging said cylinder bore and having a piston rod with a connection to said piston head on one side thereof, said piston rod extending exteriorly of said cylinder bore and having welding electrode attachment means on the outer end thereof, a piston structure guiding member secured to said cylinder and extending into one end of said cylinder bore, said guiding member having a flat-sided piston structure guiding bore therethrough, said piston structure having a guide rod extending axially from said piston head on the opposite side thereof from said piston rod into reciprocatory engagement with said guiding bore, said guide rod having corresponding flat sides reciprocably engaging the flat sides of said guiding bore and restraining said guide rod against rotation relatively to said guiding member, and means for supplying pressure fluid to the opposite ends of said cylinder bore on opposite sides of said piston head whereby to reciprocate said piston rod and the welding electrode attached thereto, said guiding member having a fluid passageway therethrough disposed laterally of said guiding bore.

2. An electrode-reciprocating spot welding gun, according to claim 1, wherein said guiding bore is of predominantly rectangular cross-section and wherein said guide rod is of complementary predominantly rectangular cross-section.

3. An electrode-reciprocating spot welding gun, according to claim 2, wherein said guiding member has a fluid passageway therethrough disposed laterally of said guiding bore on each of the opposite sides thereof and extending into said bore, said passageways being of smaller diameter than said bore and forming therein opposite guide grooves of generally rectangular cross-section guidingly engaging said guide rod.

4. An electrode-reciprocating spot welding gun, comprising a cylinder structure having a cylinder bore therein, a piston structure having a piston head reciprocably engaging said cylinder bore and having a piston rod with a connection to said piston head on one side thereof, said piston rod extending externally of said cylinder bore and having welding electrode attachment means on the outer end thereof, means for supplying pressure fluid to the opposite ends of said cylinder bore on opposite sides of said piston head whereby to reciprocate said piston rod and the welding electrode attached thereto, said connection including an axial recess in said piston head slidably receiving the inner end of said piston rod and a coupling element loosely connecting said piston head to said piston rod for relatively sliding motion therebetween, and a plurality of convexo-concave spring washers disposed in face-to-face nesting engagement between the end of said recess and said inner end of said piston rod.

5. An electrode-reciprocating spot welding gun, according to claim 4, wherein said inner end of said piston rod has an axially-elongated slot therein and wherein said coupling element passes through said slot.

References Cited in the file of this patent
UNITED STATES PATENTS

| | | |
|---|---|---|
| 1,231,257 | Herr | June 26, 1917 |
| 1,264,726 | White | Apr. 30, 1918 |
| 1,806,083 | Roberts | May 19, 1931 |
| 2,342,812 | Martinson | Feb. 29, 1944 |
| 2,356,598 | Lang | Aug. 22, 1944 |
| 2,578,727 | Mork | Dec. 18, 1951 |
| 2,638,718 | Rowe | May 19, 1953 |
| 2,661,599 | Folmer | Dec. 8, 1953 |